3,347,765
INTRODUCTION OF POLYFLUOROALKYLTHIO GROUPS INTO HYDROCARBONS
John F. Harris, Jr., Wilmington, Del., assignor to E. I. du Pont de Nemours and Company, Wilmington, Del., a corporation of Delaware
No Drawing. Filed Mar. 24, 1967, Ser. No. 625,573
16 Claims. (Cl. 204—162)

ABSTRACT OF THE DISCLOSURE

Fluorinated alkylthio substituents can be introduced into hydrocarbons, including hydrocarbon polymers by reacting a fluorinated alkanesulfenyl chloride with the hydrocarbon in the presence of free radical initiators, including U.V. irradiation. The hydrocarbons substituted with fluorinated alkylthio groups are useful as solvents for polymers, coating materials and in the case of the high molecular weight products, as elastomers.

References to related application

This application is a continuation-in-part of S.N. 322,520, filed Nov. 8, 1963, now abandoned.

Background of the invention

This invention relates to a process for introducing polyfluoroalkylthio groups into hydrocarbons, i.e., a process for preparing polyfluoroalkyl hydrocarbyl sulfides.

Both monomeric and polymeric polyfluoroalkyl hydrocarbyl sulfides are known to be useful materials. Depending on their molecular weights, these compounds find applications as, for example, solvents for polymers, coating materials, and/or elastomers. Such uses are described, for example, in U.S. 3,062,894 and U.S. 3,048,569. The principal known methods for making the compounds require as intermediates either (a) organometallic compounds, including organomercury compounds, which are frequently expensive and can be toxic, or (b) ethylenically unsaturated compounds, which offer the possibility of side reactions.

Description of the invention

It has now been found that polyfluoroalkylthio groups can be simply and economically introduced into hydrocarbons by reacting a polyfluoroalkanesulfenyl chloride in which the carbon bonded to the sulfenyl chloride (—SCl) sulfur atoms bears at least two fluorines, in the presence of a free-radical initiating source, with a substantially aliphatically saturated (i.e., substantially free of aliphatic unsaturation) hydrocarbon that contains at least one aliphatic carbon-hydrogen (C—H) group.

A polyfluoroalkyl group is defined herein as a primary alkyl group containing more than one fluorine substituent and which may contain, in addition, chlorine. In particular, perfluoroalkyl groups are preferred for reason of availability. Most preferably, lower perfluoroalkyl groups are preferred, especially perfluoromethyl groups.

Polyfluoroalkanesulfenyl chlorides used in the novel process can be represented by the formula (1)        R—CF$_2$—SCl where R is fluorine, chlorine, perhaloalkyl, or ω-hydroperhaloalkyl wherein the halo groups in the latter two radicals are chloro or fluoro and at least one of them is fluoro. When R is perhaloalkyl or ω-hydroperfluoroalkyl, it is preferably of 1–6 carbon atoms.

The preferred perhaloalkyl is, because of ease of preparation, perfluoroalkyl, most preferably lower perfluoroalkyl. For the same reason, when the alkyl groups contain chlorine or hydrogen, said group is preferably of at most two carbons.

Thus preferred R groups are those in which R is fluorine, chlorine, chlorofluoromethyl, chlorodifluoromethyl, difluoromethyl or lower perfluoroalkyl.

Specific examples of preferred polyfluoroalkanesulfenyl chlorides include: $CF_3SCl$, $C_2F_5SCl$, n-$C_3F_7SCl$, n-$C_4F_9SCl$, $(CF_3)_2CF(CF_2)_4SCl$, n-$C_8F_{17}SCl$, n-$C_{11}F_{23}SCl$, $ClCF_2SCl$, $ClCF_2CF_2SCl$, $HCFClCF_2SCl$, and $HCF_2CF_2SCl$.

The hydrocarbon coreactants include both monomeric and polymeric hydrocarbons which are substantially aliphatically saturated.

The term "substantially aliphatically saturated" is intended to apply in particular to hydrocarbon polymers, such as polyethylene and polypropylene, that are essentially free of carbon-carbon unsaturation throughout the polymer chain but may contain a trace of unsaturation in a terminal group.

Examples of hydrocarbon polymers that can be used include polyethylene (both low- and high-density), polypropylene, polyisobutylene, polystyrene, polymethylstyrenes, ethlene/propylene copolymers, isobutylene/styrene copolymers, and polymethylene obtained by hydrogenation of carbon monoxide or by decomposition of diazomethane. Polymers of low, medium, or high molecular weight are operable. For example, polyethylene in the form of liquids, greases, waxes, or tough solids can be used. Because of availability, polymers and copolymers of olefins of 2–4 carbons, especially polyethylene, are preferred.

The monomeric hydrocarbons that can be used can be cyclic or acyclic, and either of these types can contain chain-branching. Since hydrocarbon polymers are easily operable in the process, there is obviously no upper limit in carbon content. However, monomeric hydrocarbons of at most about 20 carbons are relatively more available and therefore preferred. Mixtures of hydrocarbons can also be used. Physically, the hydrocarbons can be gaseous, liquid, or solid at ordinary temperature and pressure. Examples of operable monomeric hydrocarbons are methane, ethane, cyclopentane, isohexane bicyclo[2.2.1]heptane, camphane, p-menthane, petroleum ether, 2,3,3-trimethylpentane, toluene, the xylenes, ethylbenzene, dodecylbenzene, α - methylnaphthalene, commercially available mixed alkylbenzenes made by alkylation of benzene with olefins, decane, hexadecane, and eicosane.

Hydrocarbon polymers including copolymers, substantially free of aliphatic unsaturation, constitute a preferred embodiment of the hydrocarbon reactant used in the novel process.

Process variables

The ratio of reactants can vary considerably and is dictated to some extent by the stoichiometry of the desired reaction. The mole ratio of hydrocarbon to sulfenyl chloride can be as low as 0.5:1 or lower or as high as about 10:1 or higher, but usually a ratio of between 1.5:1 and 5:1 is used.

A solvent or diluent is not required, but an inert solvent or diluent can be used if desired. Use of a solvent can be advantageous when the hydrocarbon or substituted hydrocarbon is a solid, and especially when it is a solid polymer. Operable solvents include aromatic hydrocarbons, such as benzene, or naphthalene, for reactions conducted above its melting point; aromatic halohydrocarbons, such as chlorobenzene, α-chloronaphthalene, and the fluorobenzenes; perhalocarbons such as carbon tetrachloride and 1,1,2-trichlorotrifluoroethane; and inert nitriles such as acetonitrile and benzonitrile. When the hydrocarbon reactant is a liquid under the reaction conditions, an excess of it can function as a solvent. Polymers can be treated by the process of the invention in bulk, in solution, or in the form of shaped objects, e.g., films, fibers, and tubes.

Conventional free-radical sources, such as ultraviolet radiation and azonitriles, can be used as initiators for the process, as well as any other free-radical source, such as organic peroxides.

When ultraviolet radiation is the free-radical source, temperatures of from about −50° C. to 100° C. or higher can be used. The process is conveniently carried out at ordinary temperatures (20–30° C.) and pressures if the reaction mixture is a liquid under these conditions, or at reflux temperature if the mixture boils below ordinary temperatures.

When an azonitrile or a peroxide is the free-radical source, temperatures of about 25° C. to 200° C. are usually employed, the exact temperature depending on the decomposition temperature of the initiator, i.e., the temperature at which the initiator furnishes free radicals. For the most widely used free-radical initiators, this temperature is usually between about 50° C. and 150° C. For azoisobutyronitrile, a commonly employed free-radical source, temperatures between about 65° and 100° C. are preferred.

Either atmospheric, subatmospheric, or superatmospheric pressure can be used. Many embodiments of the process are most conveniently carried out in open systems, i.e., at atmospheric pressure. When temperatures above the boiling point of the system are desired, the process is easily carried out at the autogenous pressure of a closed system.

The reaction time can vary widely and is usually between about 5 minutes and about 20 hours for reactions initiated by ultraviolet radiation, and between about one hour and about ten hours for reactions initiated by an azonitrile or an organic peroxide. The products are isolated by well-known, conventional methods, including distillation, gas chromatography, and crystallization for monomeric compounds and precipitation in nonsolvents for polymers.

*Properties of the products*

Because of the wide range of starting materials, especially the hydrocarbon starting material, the products of the process of the invention have widely varying properties. The monomeric products are for the most part distillable, colorless liquids, stable to air and water. They are useful as solvents, especially for fluorinated polymers, and can be used for this purpose at moderately high temperatures if desired. The properties of the polymeric products of the process of this invention depend considerably on the properties of the starting polymers. Introduction of polyfluorohaloalkylthio groups into polymers can bring about increases in elasticity, water repellency, heat stability, surface lubricity, solubility, and ease of workability. Thus the polymers produced by the process are useful in known polymeric applications where elasticity, water repellency, etc. is desired.

*Preparation of intermediates*

The polyfluoroalkanesulfenyl chlorides used in the process of the invention can all be prepared by known methods. In particular, perfluoroalkanesulfenyl chlorides can be made by the method of Haszeldine and Kidd, J. Chem. Soc., 1953, 3219. Polyhaloethanesulfenyl chlorides are conveniently prepared by addition of hydrogen sulfide to the corresponding polyhaloethylene in the presence of a free-radical source, followed by chlorination with free chlorine, as described by Harris and Stacey, J. Am. Chem. Soc., 85, 749 (1963). For example, 2-chloro-1,1,2-trifluoroethanesulfenyl chloride is prepared by this method from chlorotrifluoroethylene.

The following examples illustrate the process of the invention and the products of the process.

EXAMPLE 1

*n-Butyl trifluoromethyl sulfide, sec-butyl trifluoromethyl sulfide*

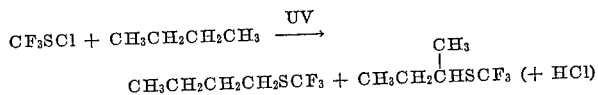

A mixture of 51 g. of n-butane and 52 g. of trifluoromethanesulfenyl chloride was allowed to reflux for two hours in a quartz reactor fitted with a condenser cooled with a mixture of acetone and solid carbon dioxide. During this time the mixture was irradiated with ultraviolet light from a low-pressure mercury resonance lamp. The temperature of the reaction mixture was about 0–20° C., the temperature rising gradually as the relatively volatile reactants were consumed to form relatively nonvolatile products. The condenser and the lamp were removed, and volatile materials were removed by evaporation and distillation up to 36° C. The components of the residual liquid were analyzed by gas chromatography and shown to include n-butyl trifluoromethyl sulfide and sec-butyl trifluoromethyl sulfide.

The n-butyl isomer was identified by comparison of its retention time in analytical-scale gas chromatography with that of an authentic sample prepared by the reaction of bis(trifluoromethylthio)mercury with n-butyl iodide; B.P. 90–93° C., $n_D^{25}$ 1.3677–1.3681.

*Analysis.*—Calcd. for $C_5H_9F_3S$: C, 37.9; H, 5.7; F, 36.1; S, 20.3. Found: C, 38.3; H, 6.2; F, 35.5; S, 20.7.

The sec-butyl isomer was separated from the reaction mixture by preparative-scale gas chromatography and was identified by comparison of its proton n-m-r (nuclear-magnetic-resonance) spectrum and its retention time in analytical-scale gas chromatography with those of an authentic sample. The latter was prepared by reaction of bis(trifluoromethylthio)mercury with sec-butyl iodide; B.P. 82–83° C., $n_D^{25}$ 1.3673.

*Analysis.*—Calcd. for $C_5H_9F_3S$: C, 37.9; H, 5.7; F, 36.1; S, 20.3. Found: C, 38.3; H, 5.9; F, 35.6; S, 20.8.

EXAMPLE 2

*Tert-butyl trifluoromethyl sulfide, isobutyl trifluoromethyl sulfide*

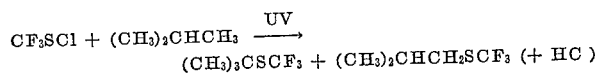

In the apparatus of Example 1, a mixture of 24 g. of isobutane and 19 g. of trifluoromethanesulfenyl chloride was irradiated with ultraviolet light for 28 minutes at about 0–25° C. Volatile material was allowed to evaporate, and the remaining liquid was separated by preparative-scale gas chromatography to give tert-butyl trifluoromethyl sulfide and isobutyl trifluoromethyl sulfide.

The tert-butyl isomer was identified by its proton n-m-r spectrum and by elemental analysis; B.P. 70–71° C., $n_D^{25}$ 1.3663.

*Analysis.*—Cald. for $C_5H_9F_3S$: C, 38.0; H, 5.7; F, 36.1. Found: C, 39.0; H, 5.8; F, 35.9.

The isobutyl isomer was identified by comparison of its proton n-m-r spectrum and its retention time in analytical-scale gas chromatography with those of an authentic sample. The latter was prepared by addition of trifluoromethanethiol to isobutylene in the presence of ultraviolet radiation; B.P. 85° C., $n_D^{25}$ 1.3647–1.3649.

*Analysis.*—Calcd. for $C_5H_9F_3S$: C, 37.9; H, 5.7; S, 20.3. Found: C, 37.6; H, 5.9; S, 20.1.

EXAMPLE 3

*Cyclohexyl trifluoromethyl sulfide*

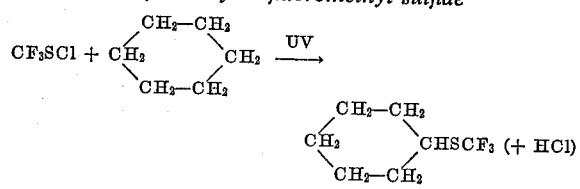

A mixture of 30 g. of trifluoromethanesulfenyl chloride and 60 ml. of cyclohexane was irradiated at about 0–25° C. for 27 minutes in the reactor of Example 1. The mixture was chilled in ice and filtered to remove a trace of insoluble solid. Excess cyclohexane and other volatile materials were removed by distillation up to 79° C. The residual liquid was subjected to preparative-scale gas chromatography to separate cyclohexyl trifluoromethyl sulfide. The product was identified by comparison of its infrared absorption spectrum with that of an authentic sample prepared by addition of trifluoromethanethiol to cyclohexene in the presence of ultraviolet radiation; B.P. 72° C./60 mm., $n_D^{25}$ 1.4180.

*Analysis.*—Calcd. for $C_7H_{11}F_3S$: C, 45.6; H, 6.0; S, 17.4. Found: C, 45.9; H, 6.3; S, 17.2.

EXAMPLE 4

*Cyclohexyl trifluoromethyl sulfide*

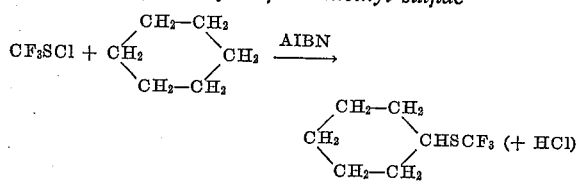

A tubular glass reactor was charged with 31.2 g. of cyclohexane, 12 g. of trifluoromethanesulfenyl chloride, and 0.66 g. of azoisobutyronitrile (AIBN). It was cooled at about −80° C., evacuated, sealed, and heated at 80° C. and autogenous pressure for eight hours. The reactor was cooled in liquid nitrogen, opened, and allowed to warm to room temperature, during which warming volatile material was allowed to evaporate. Analytical-scale gas chromatography of the residual liquid showed that it contained cyclohexyl trifluoromethyl sulfide in about the same proportion as did the crude reaction product of Example 3.

Cyclohexyl trifluoromethyl sulfide can also be prepared by substituting tert-butyl peroxide for azoisobutyronitrile in the above procedure and carrying out the reaction at about 130° C.

By the procedures of Examples 3 and 4, with routine variations as necessary, perfluoro-1-propanesulfenyl chloride can be reacted with methylcyclopentane to give cyclopentylmethyl perfluoro-n-propyl sulfide and perfluoro-n-propyl methylcyclopentyl sulfide; chlorodifluoromethanesulfenyl chloride, with heptane to give chlorodifluoromethyl heptyl sulfide; and perfluoro-1-pentadecanesulfenyl chloride, with neopentane to give neopentyl perfluoro-n-pentadecyl sulfide.

EXAMPLE 5

*Benzyl trifluoromethyl sulfide*

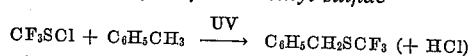

A mixture of 51.7 g. of toluene and 26 g. of trifluoromethanesulfenyl chloride was irradiated with ultraviolet light for three hours at about 0–25° C. in the apparatus of Example 1. Much hydrogen chloride was evolved during this period. The product mixture was distilled through a small spinning-band still to give 26.3 g. (72%) of benzyl trifluoromethyl sulfide (a known compound); B.P. 86° C./58 mm.–73° C./33 mm.; $n_D^{25}$ 1.4721–1.4731.

By essentially the method of Example 5, perfluoro-1-octanesulfenyl chloride can be reacted with butylbenzene to give perfluoro-n-octyl phenylbutyl sulfide; 2-chlorotetrafluoroethanesulfenyl chloride, with β-ethylnaphthalene to give β-naphthylethyl 2-chlorotetrafluoroethyl sulfide; and perfluoroethane sulfenyl chloride with bibenzyl to give 1,2-diphenylethyl perfluoroethyl sulfide.

EXAMPLE 6

*2-chloro-1,1,2-trifluoroethyl cyclohexyl sulfide*

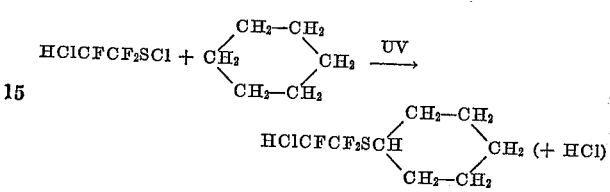

A mixture of 20 ml. of cyclohexane and 7.08 g. of 2-chloro-1,1,2-trifluoroethanesulfenyl chloride was irradiated with ultraviolet light at about 25° C. for 5 min. in the apparatus of Example 1. Examination of the crude reaction mixture by gas chromatography indicated the presence of bis(2-chloro-1,1,2-trifluoroethyl) disulfide and 2-chloro-1,1,2-trifluoro ethyl cyclohexyl sulfide. Distillation of the mixture yielded a fraction distilling at 98–100° C./28 mm., $n_D^{25}$ 1.4517, which was largely 2-chloro-1,1,2-trifluoroethyl cyclohexyl sulfide. Both a gas chromatogram and the analysis indicated that the fraction contained some bis(2-chloro-1,1,2-trifluoroethyl) disulfide. The residue was pure 2-chloro-1,1,2-trifluoroethyl cyclohexyl sulfide according to a gas chromatogram. Pure 2-chloro-1,1,2-trifluoroethyl cyclohexyl sulfide can be separated from the fraction distilling at 98–100° C./28 mm. by preparative-scale gas chromatography.

*Analysis.*—Calcd. for $C_8H_{12}ClF_3S$: F, 24.5. Found: F, 26.5.

EXAMPLE 7

*Introduction of trifluoromethylthio groups into polyethylene*

A mixture of 12 g. of nonlinear polyethylene (designated commercially as "Alathon" 14), 12 g. of trifluoromethanesulfenyl chloride, 0.66 g. of azoisobutyronitrile, and 200 ml. of benzene was heated at 80° C. and autogenous pressure with agitation for eight hours in a closed stainless-steel reactor. The reactor was cooled and opened, the mixture was boiled under reflux, and benzene was added at the boiling point until the polymer was completely in solution. The hot solution was filtered to remove traces of insoluble material and poured slowly into excess methanol with agitation. The solid polymer that precipitated was separated by filtration and dried under reduced pressure at ordinary temperature for about 18 hours and then at 50° C. for about four hours. The polymer contained 10.07% fluorine, 5.72% sulfur, and 6.79% chlorine. This analysis corresponds to an average of one trifluoromethylthio group and 1.06 combined chlorine groups for about every 15 ethylene units. The polymer had an inherent viscosity of 0.95 (0.1% in tetrahydronaphthalene at 125° C.). A film of the polymer pressed at 100–120° C. was elastic, whereas the starting polyethylene was not. A sample of the polymer lost only 0.4% weight on heating in air at 150° C. for 16 hours.

By the method described above, another substituted polymer was prepared from 12 g. of polyethylene, 6 g. of trifluoromethanesulfenyl chloride, 0.33 g. of azoisobutyronitrile, and 200 ml. of benzene, the reaction time being five hours. The product contained 5.42% fluorine, 2.82% sulfur, and 4.00% chlorine, which analysis corresponds to an average of one trifluoromethylthio group and 1.28 combined chlorine groups for about every 32 ethylene units.

By the procedures of Example 7, suitably modified if desired, varying amounts of perfluoro-n-butylthio groups can be introduced into polypropylene by reaction with perfluoro-1-butanesulfenyl chloride, perfluoro-n-undecylthio groups can be introduced into polyethylene by reaction with perfluoro-1-undecanesulfenyl chloride, and perfluoroethylthio groups can be introduced into polystyrene by reaction with perfluoroethanesulfenyl chloride.

EXAMPLE 8

*Introduction of 2-chloro-1,1,2-trifluoroethylthio groups into polyethylene*

A mixture of 6 g. of nonlinear polyethylene (designated commercially as "Alathon" 1802), 7.69 g. of 2-chloro-1,1,2-trifluoroethanesulfenyl chloride, 0.5 g. of azoisobutyronitrile, and 100 ml. of benzene was heated at reflux for two hours. The solution was poured into a large excess of ethanol to precipitate the product and the mixture was stirred for ½ hour. As much liquid as possible was removed by decantation, and fresh methanol was added. This procedure was repeated, and the polymer was isolated by filtration and dried in a vacuum oven at 60° C. for 18 hours. There was thus obtained 7.66 g. of polymer which contained 5.43% fluorine, 3.05% sulfur, and 10.8% chlorine. This analysis corresponds to the presence of one 2-chloro-1,1,2-trifluoroethylthio group and 2.2 chlorine groups for about every 28 ethylene units in the polymer chain. An opaque elastomeric film was pressed from this polymer at 135° and 2000 lbs. ram pressure.

By essentially the procedure of Example 8, 1,1,2,2,-tetrafluoroethylthio groups can be introduced into polyisobutylene by reaction with 1,1,2,2,-tetrafluoroethanesulfenyl chloride.

EXAMPLE 9

*Introduction of perfluoroisoheptylthio groups into polyethylene*

A mixture of 12 g. of nonlinear polyethylene (designated commercially as "Alathon" 1802), 200 ml. of benzene, 12 g. of perfluoroisoheptanesulfenyl chloride, [$(CF_3)_2CF(CF_2)_4SCl$], and 0.5 g. of azoisobutyronitrile was heated at reflux for 25 hours. The boiling mixture was irradiated with ultraviolet light for the last hour. It was cooled, diluted with 200 ml. of benzene, and poured into a large excess of methanol. The white, solid polymer that precipitated was separated by filtration and dried at room temperature and about 1 mm. pressure overnight and then at 90°/ca. 1 mm. for two hours. There was thus obtained 17.78 g. of polymer containing 20.83% fluorine, 3.55% chlorine, and 2.13% sulfur. This analysis corresponds to an average of one perfluoroisoheptylthio group and one and one-half chlorine atoms for about every 33 ethylene units. A film was pressed at 120° C. and 5000 lbs. pressure. This film was white, opaque, somewhat elastic, and quite slippery.

By substituting polymethylstyrene or polymethylene for polyethylene in the foregoing procedure, perfluoroisoheptylthio groups can be introduced into these polymers.

EXAMPLE 10

*Introduction of trifluoromethylthio groups into an ethylene-propylene copolymer*

A mixture of 7.5 g. of trifluoromethanesulfenyl chloride, 0.5 g. of azoisobutyronitrile, and a solution of 4.8 g. of an ethylene-propylene copolymer (39 weight percent propylene; inherent viscosity, 3.65) in 200 ml. of benzene was heated at 80° C. for eight hours. The resulting solution was poured into a large excess of methanol, and the polymer that precipitated was separated by filtration and dried in a vacuum oven at 50° C. for several hours. The weight of the dried polymer was 5.86 g. The polymer contained 10.27% fluorine, 6.00% sulfur, and 9.6% chlorine. This analysis corresponds to the presence of an average of one trifluoromethylthio group and 1.5 chlorine groups for about every four ethylene units and about every 9.2 propylene units. A sample of the polymer was pressed to a clear elastic film at 135° C. and 10,000 lbs. ram pressure.

By the process of Example 10, trifluoromethylthio groups or chlorodifluoromethylthio groups can be introduced into styrene/isobutylene copolymers by reaction with trifluoromethanesulfenyl chloride or chlorodifluoromethanesulfenyl chloride, respectively.

EXAMPLE 11

*n-Butyl chlorodifluoromethyl sulfide, sec-butyl chlorodifluoromethyl sulfide*

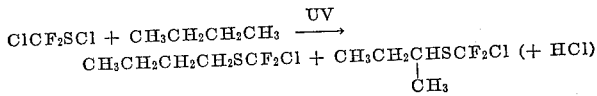

$$ClCF_2SCl + CH_3CH_2CH_2CH_3 \xrightarrow{UV}$$
$$CH_3CH_2CH_2CH_2SCF_2Cl + CH_3CH_2\underset{\underset{CH_3}{|}}{C}HSCF_2Cl \; (+ HCl)$$

A mixture of 27 g. of chlorodifluoromethanesulfenyl chloride and 36 g. of n-butane was irradiated for 46 minutes with a sunlamp in a reactor like that of Example 1. The condenser was then removed and the volatile materials were removed by evaporation. The residual liquid was analyzed by gas chromatography and found to contain n-butyl chlorodifluoromethyl sulfide and sec-butyl chlorodifluoromethyl sulfide. Pure samples of each of these sulfides were obtained by preparative-scale gas chromatography.

The n-butyl isomer boiled at 130° C.; $n_D^{25}$, 1.4160. The $H^1$ n.m.r. spectrum was almost identical to that of the n-butyl isomer described in Example 1.

*Analysis.*— Calcd. for $C_5H_9ClF_2S$: C, 34.4; H, 5.2; Cl, 20.3; F, 21.8. Found: C, 34.3; H, 5.2; Cl, 20.7; F, 22.1.

The sec-butyl isomer boiled at 128° C.; $n_D^{25}$, 1.4148. The $H^1$ n.m.r. spectrum was almost identical to that of the sec-butyl isomer described in Example 1.

*Analysis.*—Calcd. for $C_5H_9ClF_2S$: C, 34.4; H, 5.2; Cl, 20.3; F, 21.8. Found: C, 34.2; H, 4.9; Cl, 20.5; F, 22.1.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The process which comprises reacting in the presence of a free-radical initiating source, a polyfluoroalkanesulfenyl chloride in which the carbon bonded to the sulfur atom of said sulfenyl chloride bears at least two fluorines with a substantially aliphatically saturated hydrocarbon that contains at least one aliphatic carbonhydrogen group.

2. The process of claim 1 wherein the free-radical initiating source is ultraviolet radiation.

3. The process of claim 1 wherein the hydrocarbon reactant is a hydrocarbon polymer.

4. The process of claim 1 wherein the polyfluoroalkanesulfenyl chloride is a lower perfluoroalkanesulfenyl chloride.

5. The process of claim 4 wherein the hydrocarbon reactant is a hydrocarbon polymer.

6. The process which comprises reacting in the presence of a free-radical initiating source, a compound of the formula R—$CF_2$—SCl wherein R is of the class consisting of fluorine, chlorine, perhaloalkyl, and ω-hydroperhaloalkyl in which the halo substituents are of the class consisting of fluoro and chloro, the carbon chain length of R being from 1–6 carbon atoms, inclusive, and wherein said R must contain at least one fluorine atom; with a substantially aliphatically saturated hydrocarbon having at least one aliphatic carbon-hydrogen group.

7. The process of claim 6 wherein R is lower perfluoroalkyl.

8. The process of claim 6 wherein R is fluorine.

9. The process of claim 6 wherein the hydrocarbon reactant is a polymer.

10. The process of claim 9 wherein R is lower perfluoroalkyl.

11. The process of claim 9 wherein the hydrocarbon polymer is a polymer of an olefin of 2–4 carbon atoms.

12. The process which comprises reacting $CF_3SCl$ with $CH_3CH_2CH_2CH_3$ in the presence of ultraviolet radiation at a temperature of between −50° and 100° C.

13. The process which comprises reacting $CF_3SCl$ with polyethylene in the presenc of azoisobutyronitrile at a temperature of between about 65° and 100° C.

14. The process which comprises reacting $CF_3SCl$ with an ethylene-propylene copolymer in the presence of azoisobutyronitrile at a temperature of between about 65° and 100° C.

15. The process which comprises reacting $R-CF_2-SCl$ wherein R is lower perfluoroalkyl with polyethylene in the presence of azoisobutyronitrile at a temperature of between about 65° and 100° C.

16. The process which comprises reacting $$(CF_3)_2CF(CF_2)_4SCl$$

with polyethylene in presence of azoisobutyronitrile at a temperature of between about 65° and 100° C.

References Cited
UNITED STATES PATENTS

| | | | |
|---|---|---|---|
| 2,970,952 | 2/1961 | Kloosterziel | 204—163 |
| 3,048,569 | 8/1962 | Harris | 260—79.7 |

HOWARD S. WILLIAMS, *Primary Examiner.*

PO-1050
(5/69)

UNITED STATES PATENT OFFICE
CERTIFICATE OF CORRECTION

Patent No. 3,347,765      Dated October 17, 1967

Inventor(s) John F. Harris, Jr.

It is certified that error appears in the above-identified patent and that said Letters Patent are hereby corrected as shown below:

Column 2, line 43, after "isohexane" insert -- , --.

Column 7, line 18, "ethanol" should read -- methanol --.

Column 8, line 54, "carbonhydrogen" should read -- carbon-hydrogen --.

SIGNED AND SEALED
NOV 24 1970

(SEAL)
Attest:

Edward M. Fletcher, Jr.
Attesting Officer

WILLIAM E. SCHUYLER, JR
Commissioner of Patents